United States Patent [19]

Frank et al.

[11] 4,228,593
[45] Oct. 21, 1980

[54] INTERNAL DIAMETER MEASURING APPARATUS

[75] Inventors: Joseph M. Frank, Penn Hills; Robert A. Hufnagel, Forest Hills, both of Pa.

[73] Assignee: Westinghouse Electric Corp., Pittsburgh, Pa.

[21] Appl. No.: 903,377

[22] Filed: May 5, 1978

[51] Int. Cl.² .......................... G01B 7/12; G01B 7/34
[52] U.S. Cl. ................................. 33/178 F; 33/143 E
[58] Field of Search ............ 33/178 F, 178 R, 174 R, 33/143 R, 149 J, 178 E, 143 E

[56] References Cited

U.S. PATENT DOCUMENTS

| | | | |
|---|---|---|---|
| 1,583,208 | 4/1926 | Walker et al. | 33/178 F |
| 2,451,600 | 10/1948 | Woodcock | 33/178 F |
| 2,588,717 | 3/1952 | Goodwin | 33/178 F |
| 2,640,271 | 6/1953 | Boucher | 33/178 F |
| 2,876,413 | 3/1959 | Saurenman et al. | 33/178 F |
| 2,994,962 | 8/1961 | Le Bourg | 33/178 F |
| 3,024,651 | 3/1962 | McGlasson | 33/178 F |
| 3,097,433 | 7/1963 | Cubberly, Jr. | 33/178 F |
| 3,251,134 | 5/1966 | Wojcik | 33/172 E |
| 3,488,856 | 1/1970 | Wiklund | 33/178 F |
| 3,533,166 | 10/1970 | Pino, Jr. | 33/174 R |
| 3,914,870 | 10/1975 | Wiedenmann | 33/174 Q |
| 4,050,384 | 9/1977 | Chapman | 33/178 F |

*Primary Examiner*—Willis Little
*Attorney, Agent, or Firm*—L. A. DePaul; Z. L. Dermer

[57] ABSTRACT

The internal diameter measuring apparatus comprises a flexible supporting member capable of being inserted into a heat transfer tube in a nuclear steam generator with flexible centering devices disposed on the flexible supporting member at various locations along the flexible supporting member for centering the measuring apparatus within the heat transfer tube. The measuring apparatus also comprises contacting apparatus disposed on the flexible supporting member for contacting the inside surface of the heat transfer tube that is capable of deflecting in response to variations on the inside surface of the heat transfer tube. The contacting apparatus is connected to a transforming mechanism disposed in the flexible supporting member for monitoring the deflection of the contacting apparatus and for transforming the so monitored deflections into readings indicating the internal diameter of the heat transfer tube.

3 Claims, 14 Drawing Figures

INTERNAL DIAMETER MEASURING APPARATUS

BACKGROUND OF THE INVENTION

This invention relates to measuring apparatus and more particularly to measuring apparatus for determining the internal diameter of the heat transfer tubes in a nuclear steam generator.

A typical nuclear steam generator comprises a vertically oriented shell, a plurality of U-shaped tubes disposed in the shell so as to form a tube bundle, a tube sheet for supporting the tubes at the ends opposite the U-like curvature, and a dividing plate that cooperates with the tube sheet forming a primary fluid inlet plenum at one end of the tube bundle and a primary fluid outlet plenum at the other end of the tube bundle. The primary fluid having been heated by circulation through the nuclear reactor core enters the steam generator through the primary fluid inlet plenum. From the primary fluid inlet plenum, the primary fluid flows upwardly through first openings in the U-tubes near the tube sheet which supports the tubes, through the U-tube curvature downwardly through second openings in the U-tubes near the tube sheet, and into the primary fluid outlet plenum. At the same time, a secondary fluid, known as feedwater, is circulated around the U-tubes in heat transfer relationship therewith, thereby transferring heat from the primary fluid in the tubes to the secondary fluid surrounding the tubes causing a portion of the secondary fluid to be converted to steam. Since the primary fluid contains radioactive particles and is isolated from the secondary fluid by the U-tube walls and the tube sheet, it is important that the U-tubes and tube sheet be maintained defect-free so that no breaks will occur in the U-tubes or in the welds between the U-tubes and the tube sheet, thus preventing contamination of the secondary fluid by the primary fluid.

Occasionally, one or more of the heat transfer tubes may become internally dented due to a variety of possible reasons. One such reason for the internal denting is thought to be corrosion on the outside of the tube which presses in on the tube and causes the internal flow area of the tube to become constricted. Not only does this denting phenomenon restrict the flow through the particular heat transfer tube, but it also may lead to a failure in the tube at the point of denting which may allow the primary fluid to leak into the secondary fluid thus contaminating the secondary fluid. Of course, contamination of the secondary fluid must be prevented; therefore, such a dented tube must be repaired or replaced before the denting results in a crack in the tube. Since the denting phenomenon is normally a localized problem, before a particular tube can be repaired or replaced it is necessary to determine which tube or section of a tube suffers from the denting problem. Therefore, what is needed is a measuring device that is capable of being inserted into and traversing a constricted tube and yet capable of proper self-alignment within the tube such that the extent of denting and the location of the denting with respect to the longitudinal length of the tube may be determined.

SUMMARY OF THE INVENTION

Internal diameter measuring apparatus capable of being inserted into a constricted heat transfer tube of a steam generator and capable of proper self-alignment therein comprises a flexible supporting member capable of being inserted into a heat transfer tube along with flexible centering devices disposed on the flexible supporting member at various locations along the flexible supporting member for centering the measuring apparatus with respect to the inside surface of the heat transfer tube while being capable of negotiating constricted portions of the tube. The measuring apparatus also comprises contacting devices disposed in the flexible supporting member for contacting the inside surface of the heat transfer tube and capable of deflecting in response to variations in the inside surface of the tube along with transforming devices disposed in the flexible supporting member and connected to the contacting devices for monitoring the deflections of the contacting devices and for transforming the so monitored deflections into readings indicating the internal diameter of the tube. The measuring apparatus further comprises an electromagnetic device disposed in the flexible supporting member for detecting metal members through which the heat transfer tubes extend thereby indicating the longitudinal location of the measuring apparatus within the heat transfer tube for associating the deflections of the contacting devices with the proper logitudinal length of the heat transfer tube.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In a typical steam generator, a tubesheet supports a bundle of heat transfer tubes. Occasionally it is necessary to introduce a measuring device into the tube in order to determine whether or not the tube has been internally dented so that the internally dented tubes or portions thereof may be repaired or removed from the steam generator. The invention described herein provides measuring apparatus that is capable of being inserted into a constricted tube of a steam generator for measuring the internal diameter of the heat transfer tube and for determining the location of such denting with respect to the length of the tube.

Figure 1:
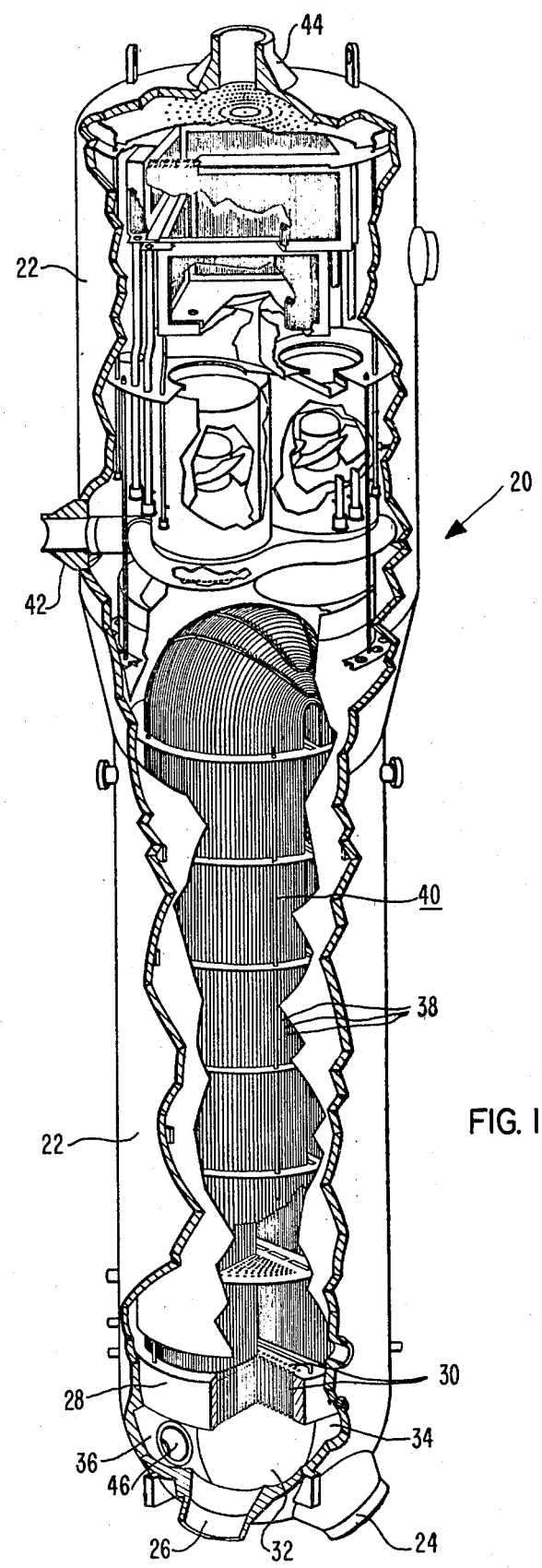
FIG. 1 is a partial cross-sectional view in elevation of a typical steam generator.

Referring to FIG. 1, a nuclear steam generator referred to generally as 20, comprises an outer shell 22 with a primary fluid inlet nozzle 24 and a primary fluid outlet nozzle 26 attached thereto near its lower end. A generally cylindrical tubesheet 28 having the tube holes 30 therein is also attached to outer shell 22 near its lower end. A dividing plate 32 attached to both tubesheet 28 and outer shell 22 defines a primary fluid inlet plenum 34 and a primary fluid outlet plenum 36 in the lower end of the steam generator as is well understood in the art. Tubes 38 which are heat transfer tubes shaped with a U-like curvature are disposed within outer shell 22 and attached to tubesheet 28 by means of tube holes 30. Tubes 38 which may number about 7,000 form a tube bundle 40. In addition, a secondary fluid inlet nozzle 42 is disposed on outer shell 22 for providing a secondary fluid such as water while a steam outlet nozzle 44 is attached to the top of outer shell 22. In operation, primary fluid which may be water having been heated by circulation through the nuclear reactor core enters steam generator 20 through primary fluid inlet nozzle 24 and flows into primary fluid inlet plenum 34. From primary fluid inlet plenum 34, the primary fluid flows upwardly through tubes 38 in tubesheet 28, up through the U-shaped curvature of tubes 38, down through tubes 38 and into primary fluid outlet plenum 36 where the primary fluid exits the steam generator through primary fluid outlet nozzle 26. While flowing through tubes 38, heat is transferred from the primary fluid to the secondary fluid which surrounds tubes 38 causing the secondary fluid to vaporize. The resulting steam then exits the steam generator through steam outlet nozzle 44. Manways 46 are provided in outer shell 22 to provide access to both primary fluid inlet plenum 34 and primary fluid outlet plenum 36 so that access may be had to the entire tubesheet 28. When it is necessary to internally measure a tube 38 in the steam generator, working personnel may enter manways 46 and insert the measuring apparatus (not shown) through the tube holes 30 and into the tubes 38 chosen to be measured.

Figure 2:
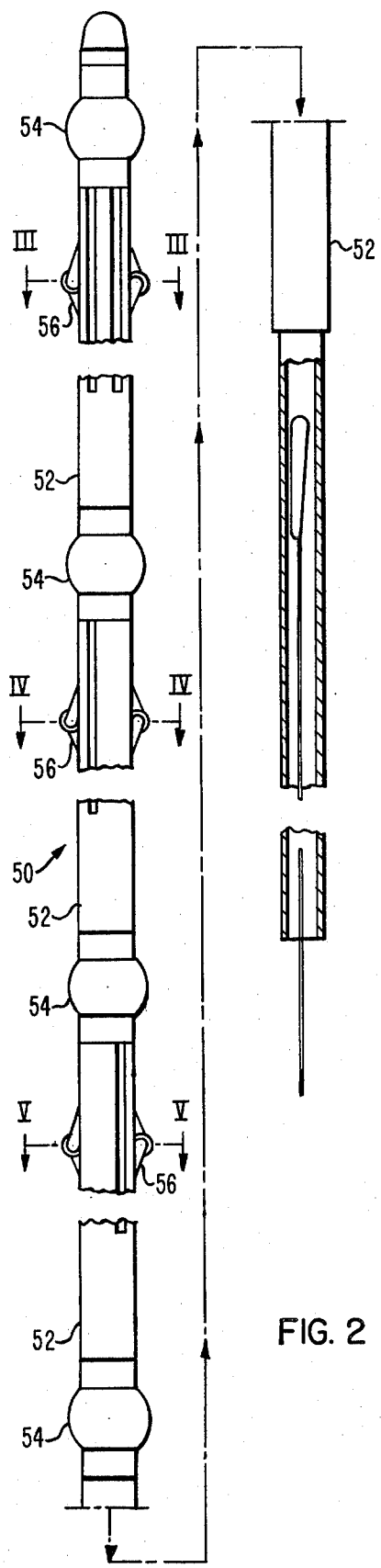
FIG. 2 is a view in elevation of the measuring apparatus.
Figure 3:
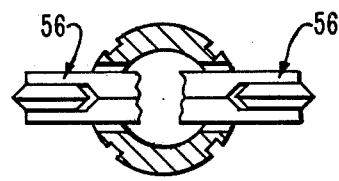
FIG. 3 is a view taken along line III—III of FIG. 2.
Figure 4:
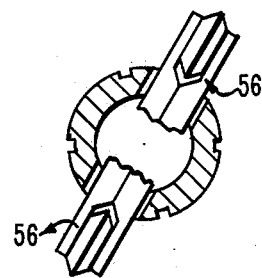
FIG. 4 is a view taken along line IV—IV of FIG. 2.
Figure 5:
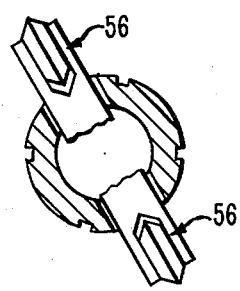
FIG. 5 is a view taken along line V—V of FIG. 2.

Referring now to FIG. 2, the measuring apparatus is referred to generally as 50 and comprises a flexible supporting member 52, flexible centering devices 54 disposed at various locations along the length of the flexible supporting member 52, and contacting devices 56 also disposed along flexible supporting member 52 at various locations and between flexible centering devices 54. Measuring apparatus 50 is capable of being inserted into a tube 38 such that flexible supporting member 52 extends into the tube 38 while flexible centering devices 54 and contacting devices 56 contact the internal surface of tube 38. Flexible centering devices 54 serve to align the flexible supporting member 52 and contacting devices 56 within the tube 38 while being capable of deflecting in response to constrictions within tube 38 so that measuring apparatus 50 may pass through the constricted tube 38 while maintaining alignment within the tube 38. Contacting devices 56 are located at various locations along the length of flexible supporting member 52 and are rotated 60° along the radius of flexible supporting member 52 with respect to the contacting device 56 located nearest to it as shown in FIGS. 3, 4 and 5. As measuring apparatus 50 is moved through a typical tube 38, contacting devices 56 contact the internal surface of the tube 38 and encounter dents that may be located on the inside surface of the tube 38.

Referring now to FIGS. 6–10, flexible supporting member 52 has a tip 58 on the front end thereof for guiding the measuring apparatus 50 through the tube 38. Flexible centering devices 54 may comprise a substantially spherical elastomeric member 60 which is mounted on flexible supporting member 52 and extends out into contact with the internal surface of tube 38. Elastomeric member 60 which may be a rubber member is capable of deforming to pass through a constricted portion of tube 38 while maintaining contact with the internal surface of tube 38 even after passage through a constricted portion of the tube 38. In this manner, flexible centering devices 54 always remain in contact with the internal surface of the tube 38 and thereby position centering devices 56 with respect to the internal surface of tube 38. Flexible centering devices 54 also comprise a flexible conduit 62 which is disposed within elastomeric member 60 and attached to flexible supporting member 52. Flexible conduit 62 is capable of bending so that measuring apparatus 50 may be inserted into the steam generator and through bends in the tube 38 without damaging the measuring apparatus 50 and while maintaining proper alignment of the members of measuring apparatus 50. Flexible conduit 62 also serves as a conduit through which electrical wiring may be extended for connection to the various devices comprising the measuring apparatus 50.

Figure 6:
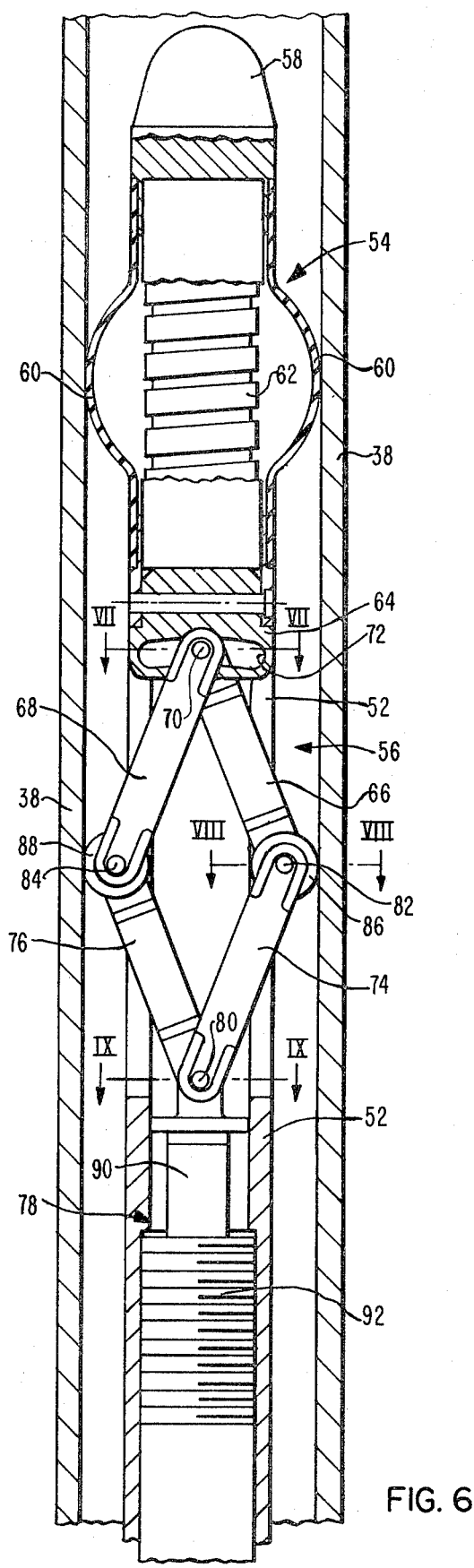
FIG. 6 is a cross-sectional view in elevation of the measuring apparatus disposed in a heat transfer tube.
Figure 7:
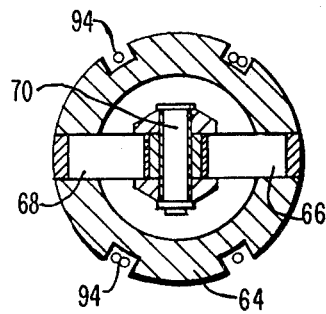
FIG. 7 is a view taken along line VIII—VIII of FIG. 6.
Figure 8:
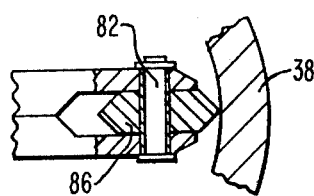
FIG. 8 is a view taken along line VII—VII of FIG. 6.
Figure 9:
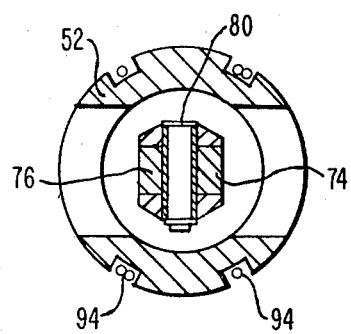
FIG. 9 is a view taken along line IX—IX of FIG. 6.
Figure 10:
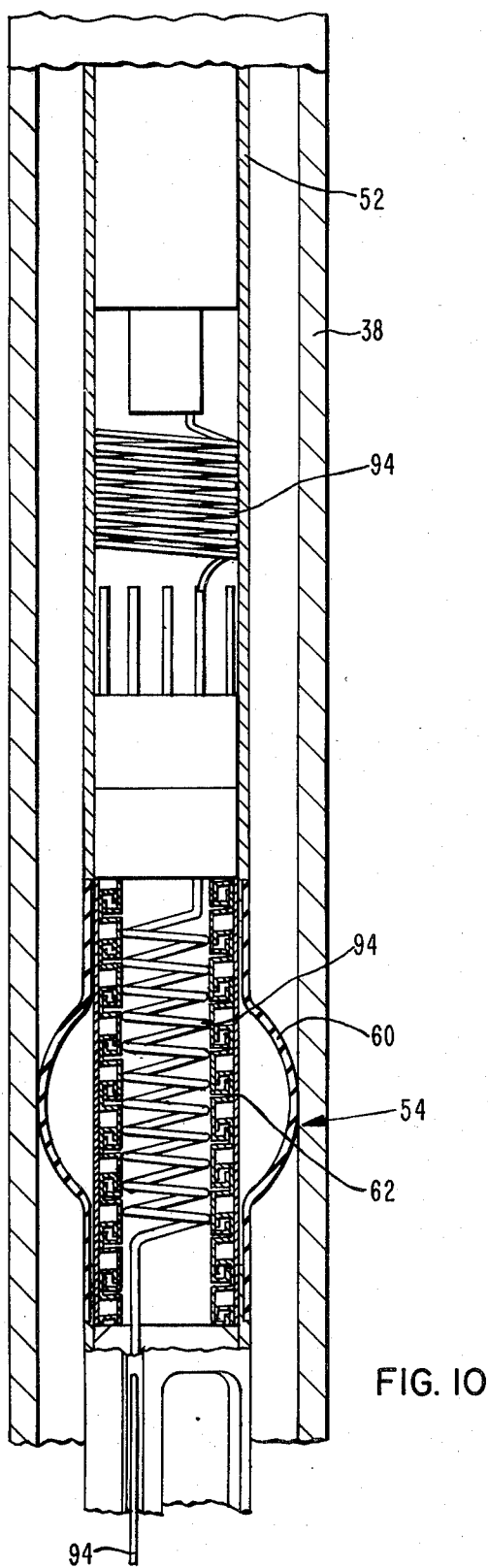
FIG. 10 is a cross-sectional view in elevation of a flexible centering device disposed within the heat transfer tube.

Still referring to FIGS. 6–10, contacting devices 56 comprise a slotted member 64 attached to flexible supporting member 52. Contacting devices 56 also comprise a first link 66 and a second link 68 pivotally connected at their first ends through slotted member 64 by a first pin 70. First pin 70 pivotally connects first link 66 and second link 68 and is capable of sliding through the slot 72 in slotted member 64. Slot 72 has a slight curvature as is shown in FIG. 6 and is provided for guiding first pin 70 when contacting devices 56 are deflected. A third link 74 and a fourth link 76 are pivotally connected at their first ends to a transforming mechanism 78 by means of a second pin 80 with the second end of third link 74 pivotally connected to the second end of first link 66 by means of a third pin 82 and with the second end of fourth link 76 being pivotally connected to the second end of second link 68 by means of a fourth pin 84. A first roller 86 is rotatably disposed about third pin 82 and a second roller 88 is rotatably disposed about fourth pin 84. First roller 86 and second roller 88 are arranged to contact the inside surface of tube 38 and are designed to cause third link 74 and fourth link 76 to exert force on transforming mechanism 78 when either of first roller 86 or second roller 88 encounters a constriction in tube 38. Transforming mechanisms 78 which may be a linear variable differential transformer chosen from those well known in the art comprises an armature 90 and an electromagnetic portion 92. Armature 90 is connected to third link 74 and fourth link 76 by means of second pin 80. When either first roller 86 or second roller 88 encounters a constriction in the inner surface of tube 38, third link 74 or fourth link 76 exert a force on armature 90 which causes armature 90 to be inserted further into electromagnetic portion 92. The further insertion of armature 90 into electromagnetic portion 92 causes the electromagnetic portion 92 to experience a different electromagnetic field. As is well known in the art, this difference in electromagnetic field can be translated into a number that represents the distance that the armature 90 has been inserted into electromagnetic portion 92. Calibration of contacting devices 56 with transforming mechanism 78 in a manner well understood by those skilled in the art of linear variable differential transformers, allows the reading of electromagnetic portion 92 to be correlated with the deflection of first roller 86 or second roller 88. Of course, the deflection of first roller 86 or second roller 88 corresponds to the variation of internal diameter of tube 38 at that particular point along the tube 38. Electromagnetic portion 92 is electrically connected by means of wires 94 to instrumentation (not shown) located outside of the steam generator. This instrumentation may include a paper chart that indicates the magnitude of the deflection of first roller 86 or second roller 88 as a function of the length along the tube 38. Each of the contacting devices 56 may be so connected to a different pencil on the paper chart such that the readings of all the contacting devices 56 may be read at once and compared. Since each contacting device 56 within a group of three contacting devices 56 are rotated 60° with respect to the one next to it and since each contacting device 56 has a first roller 86 and a second roller 88, each set of three contacting devices 56 will give three separate readings. Since a particular constriction on the inside surface of tube 38 may not extend the entire inner circumference of the tube 38, such a localized constriction would be encountered by less than the three contacting devices 56 and would be indicated on the paper chart as such. Since the location of each centering device 56 relative to the tube 38 is known by the operator, a reading of a constriction by less than three of the contacting devices 56 would indicate to the operator the location of the constriction along the inside diameter of the tube 38.

Figure 11:
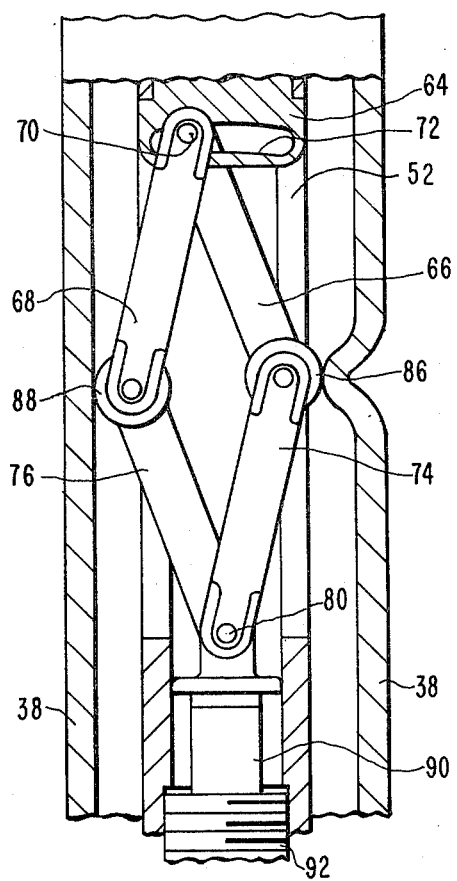
FIG. 11 is a cross-sectional view in elevation of the contacting device being deflected by a dent along one side of the heat transfer tube.
Figure 12:
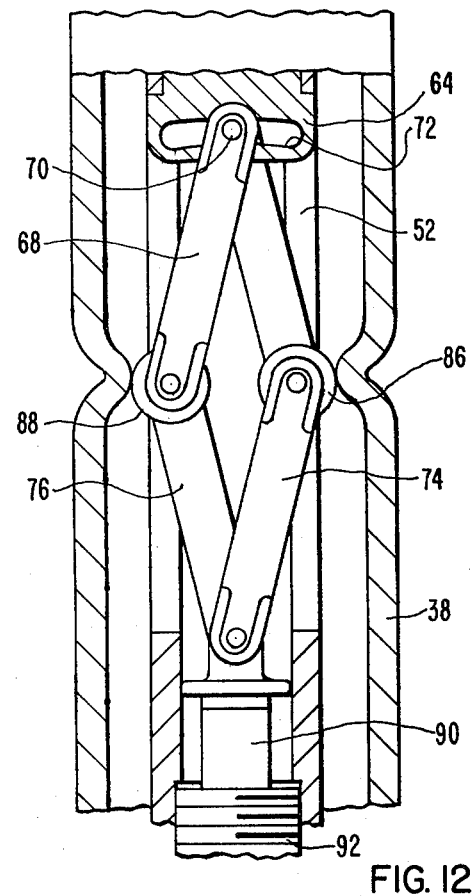
FIG. 12 is a cross-sectional view in elevation of the contacting device deflected by two dents in the heat transfer tube.

Referring now to FIG. 11, when only one roller such as first roller 86 encounters a constriction as shown in FIG. 11, first roller 86 exerts a force on first link 66 and third link 74. The force on first link 66 causes first pin 70 to ride through slot 72 in slotted member 64 so that second roller 88 and first roller 86 remain in contact with the inside surface of tube 38. In this manner, armature 90 is only depressed an amount corresponding to the deflection of first roller 86 as it encounters the constriction in the tube 38. If first pin 70 were not allowed to slide in slot 72 and only one roller such as first roller 86 were to encounter a constriction in the tube 38, second roller 88 would no longer be in contact with the smooth inner surface of tube 38 and armature 90 would be depressed by an amount greater than the deflection of a single first roller 86 thereby giving an incorrect reading on the paper chart. Therefore, the sliding of first pin 70 within slot 72 provides a mechanism whereby a single roller may encounter a single constriction while the other roller does not encounter a constriction and the reading on the paper chart would accurately reflect this situation. Referring now to FIG. 12, should both first roller 86 and second roller 88 each encounter a constriction as shown in FIG. 12, first pin 70 would not slide in slot 72 due to equal forces on first roller 86 and second roller 88 and would cause armature 90 to be depressed by an amount twice as great as that which would be encountered in a situation such as in FIG. 11. The read-out on the paper chart for a situation such as FIG. 12, would not indicate whether there was a constriction twice as large as that in FIG. 11 or whether there were two constrictions as shown in FIG. 12. However, since there are more than one contacting device 56 and since these contacting devices are rotated at an angle of 60° with respect to the adjacent contacting device 56, if one of the other contacting devices 56 does not indicate a constriction of the magnitude comparable to that of the others, the length of the constriction around the inside of the tube can thus be determined.

Figure 13:
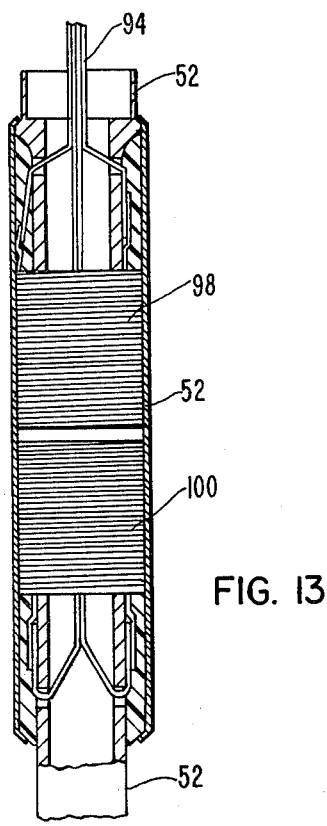
FIG. 13 is a cross-sectional view in elevation of the electromagnetic device.

Referring now to FIG. 13, measuring apparatus 50 also comprises an electromagnetic detector 96 disposed on flexible supporting member 52. Electromagnetic detector 96 may be a typical electromagnet chosen from those well known in the art and may comprise a first coil 98 and a second coil 100 through which an electric current is conducted. When measuring apparatus 50 is passed through a typical tube 38, electromagnetic detector 96 passes support plates at various locations along the tube length which are used to support tubes 38. As electromagnetic detector 96 passes these magnetic support plates, the magnetic field in electromagnetic detector 96 is altered such that the current flowing through first coil 98 and second coil 100 is altered. This change in current may also be shown on the paper chart along with the read-out from the contacting devices 56. Since the locations of the magnetic support plates within the steam generator are known, the detection of the magnetic support plates by electromagnetic detector 96 and the readout on the paper chart, can be correlated with the readings from the contacting devices 56 such that the reading of the contacting devices 56 can be correlated with the distance along the longitudinal length of the tube 38. In this manner, the location of the constriction in the tube 38 with respect to the longitudinal length of tube 38 may be ascertained. In addition, the length of the measuring apparatus 50 that has been inserted into the tube 38 may be manually determined and this reading may also be correlated with the readings of centering devices 56 to determine the location of the constriction with respect to the length of the tube 38.

Figure 14:
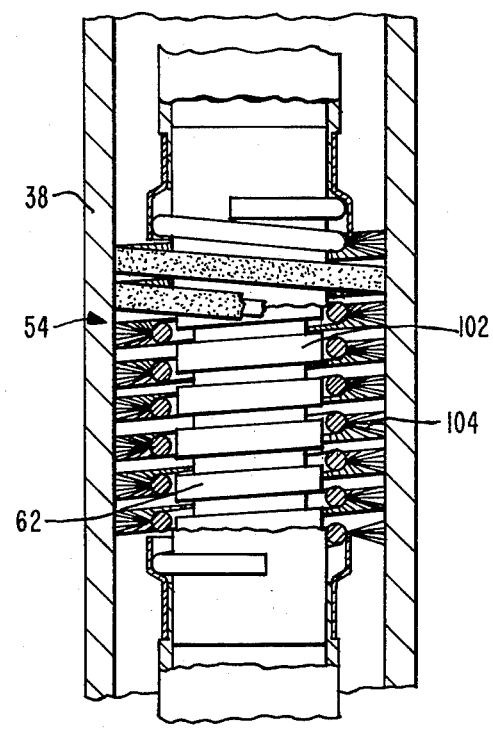
FIG. 14 is a cross-sectional view in elevation of an alternative centering device.

Referring to FIG. 14, as an alternative to the elastomeric member 60, the flexible centering device 54 may comprise a spirally-wound member 102 attached to flexible conduit 62 and having wire bristles 104 extending into contact with the inside of the tube 38 for positioning the measuring apparatus 50 within the tube 38.

OPERATION

When it has been determined that a particular tube 38 may have a constriction therein, the steam generator 20 is deactivated and working personnel enter manways 46. The working personnel insert the measuring apparatus 50 with tip 58 on the leading edge into the tube 38 chosen to be inspected. Measuring apparatus 50 is then activated along with the paper charts. As measuring apparatus 50 is inserted into the tube 38, flexible supporting member 52 may be bent along its length and particularly at the flexible centering devices 54 so that the measuring apparatus 50 may be easily introduced further into the tube 38. As each flexible centering device 54 is inserted into the particular tube 38, the flexible centering devices 54 contact the inside surface of the tube 38 thereby positioning the centering devices within the tube 38. Transforming mechanisms 78 exerts a biasing force on armature 90 such that first roller 86 and second roller 88 are in contact with the inside surface of the tube 38 as shown in FIG. 6. As the measuring apparatus 50 is further introduced into the tube 38, the working personnel note the length of insertion into the tube 38 while the paper chart records the deflection, if any, of the first roller 86 and the second roller 88 along with any detection by electromagnetic detector 96. When a roller such as first roller 86 encounters a constriction as shown in FIG. 11, armature 90 is depressed into the electromagnetic portion 92. The signal from electromagnetic portion 92 is then transmitted by electrical wires such as wires 94 to the paper charts where the signal is indicated on the paper chart. When the roller that has encountered the constriction has passed that particular constriction, the biasing mechanism in transforming mechanism 78 causes the roller to stay in contact with the inside portion of tube 38 which generates a signal that is read on the paper chart which indicates that the roller has passed the constriction. The other contacting devices 56 may or may not encounter the particular constriction depending on the length of the constriction around the inside diameter of the tube 38 since the other contacting devices 56 are rotated at an angle of 60° with respect to the contacting device adjacent to it. Because all of the readings on the paper chart corresponding to the contacting devices 56 may be correlated, the radial magnitude of the constriction along with its circumferential length together with the location of the constriction with respect to the length of the tube 38 may be determined. Of course, more than one constriction may appear in any particular tube and would appear on the paper chart readings as such. Therefore, it can be seen that the invention provides an internal diameter measuring apparatus capable of being inserted into a tube in a nuclear steam generator for measuring the internal diameter of the tube into which it is inserted.

We claim as our invention:

1. Measuring apparatus for internally measuring tubes comprising:
   a flexible supporting member capable of being inserted into a tube;
   flexible centering devices disposed on said flexible supporting member at various locations along said flexible supporting member for centering said flexible supporting member with respect to the inside surface of said tube while being capable of negotiating constricted portions of said tube;
   electromagnetic means disposed in said flexible supporting member for detecting metal members through which said tubes are disposed thereby indicating the longitudinal location of said measuring apparatus in said tube;
   a linear variable differential transformer disposed in said flexible supporting member for transforming the force exerted on said linear variable differential transformer into a reading corresponding to the internal diameter of said tube;
   a slotted member disposed in said flexible supporting member;
   a first and a second link pivotally connected at their first ends through said slotted member and capable of sliding along said slotted member;
   a third link and a fourth link pivotally connected at their first ends to said linear variable differential transformer with the second end of said third link pivotally connected to the second end of said first link and with the second end of said fourth link pivotally connected to the second end of said second link; and
   a first roller attached to the connection of said first and third links and a second roller attached to the connection of said second and fourth links, said rollers contacting said inside surface of said tube and causing said third and fourth links to exert force on said linear variable differential transformer when either of said rollers encounters a constriction in said tube with said linear variable differential transformer transforming the so monitored force into readings indicating the internal diameter of said tube.

2. The measuring apparatus according to claim 1 wherein said flexible centering device comprises:
   a flexible conduit disposed in said flexible supporting member for allowing electrical connectors to pass therethrough and for allowing said measuring apparatus to negotiate bends in said tube; and
   a substantially spherical elastomeric member disposed around said flexible conduit capable of negotiating constrictions in said tube for contacting said inside surface of said tube thereby positioning said measuring apparatus within said tube.

3. The measuring apparatus according to claim 1 wherein said flexible centering device comprises:
   a flexible conduit disposed in said flexible supporting member for allowing electrical connectors to pass therethrough and for allowing said measuring apparatus to negotiate bends in said tube; and
   a spirally wound member attached to the outside of said flexible conduit and having wire bristles extending into contact with said inside of said tube for positioning said measuring apparatus within said tube.

* * * * *